May 26, 1936.  C. E. H. WATSON  2,042,031
PLOTTING DEVICE
Filed Dec. 11, 1933  2 Sheets-Sheet 1

Charles Edward Hubert Watson INVENTOR

BY

ATTORNEY

May 26, 1936.  C. E. H. WATSON  2,042,031
PLOTTING DEVICE
Filed Dec. 11, 1933   2 Sheets-Sheet 2

INVENTOR
Charles Edward Hubert Watson,
BY
Franks Appleman
ATTORNEY

Patented May 26, 1936

2,042,031

UNITED STATES PATENT OFFICE 2,042,031

PLOTTING DEVICE

Charles Edward Hubert Watson, West Dulwich, London, England

Application December 11, 1933, Serial No. 701,904
In New Zealand October 21, 1932

7 Claims. (Cl. 33—1)

Applications have been filed in Great Britain February 22, 1933, Patent No. 404,818, and in New Zealand, Oct. 21, 1932, said New Zealand application having been withdrawn.

This invention relates to devices used by surveyors and civil engineers in plotting cross sections. The object of the invention is to provide a device which will give quick and accurate results in plotting cross sections for roads, railways and the like, when angles and measurements have been measured with clinometer and tape, or other suitable instruments.

According to the invention, the plotting device is in the form of a semi-circular plate of which the straight diametral edge is marked in scale divisions from zero at the centre and reading outwards and the curved edge is marked in angular divisions starting from zero perpendicularly opposite the zero of the diametral edge and extending outwards to read 90° at the ends of the diametral edge, the said plate being provided with means for enabling the device to be pivoted about the zero point in the diametral edge. The line between the two zeros is thus at right angles to the straight edge and is herein referred to as the zero line.

By setting the zero of the straight edge at a selected point on a vertical plotting line, and swinging the zero of the angle divisions until the angle marked on the protractor in line with the plotting line coincides with the angle of elevation or depression determined in the field, the measured distance to the point to which the angle of elevation or depression was read may then be readily marked off along the straight edge scale, and the point in the field thus plotted on the paper.

In addition, a secondary scale may be provided on the plotter, this scale being formed, either by a scale identical with, parallel to, and at a suitable distance from the straight edge scale, or by a set of lines parallel to the zero line and at each side thereof, so as to enable the straight edge to be moved to right and left of the plotting line, and at the same time be maintained at right angles thereto, and a new zero mark therefore to be made on the paper for a "change point".

Various forms of the plotting device according to the invention will now be described by way of example with the aid of the accompanying drawings, wherein:—

Figure 1:
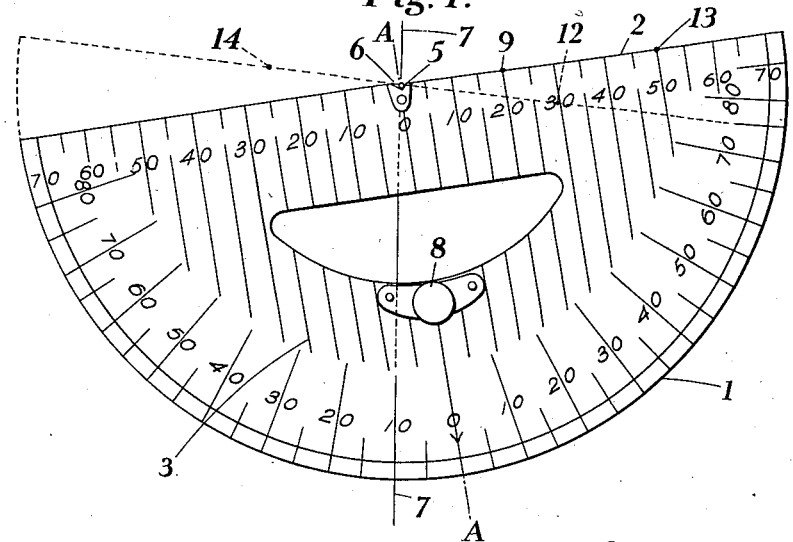
Figure 1 is a plan of a form of plotter for use with a separate pin.

Referring to the drawings, the plotter is in the form of a semi-circular plate 1 having the straight diametral edge 2 which is marked in suitable scale divisions from the zero at the centre and reading outwards therefrom as shown, while the curved edge is marked in angle divisions starting from zero perpendicularly opposite the zero of the straight edge and extending to right and left to read 90 degrees at the ends of the straight edge. The line between the two zeros is then at right angles to the straight edge and is herein referred to as the zero line.

Another scale, hereinafter referred to as the "secondary scale", is provided on the plotter for setting out points from a new zero mark on the paper or "change point"; this scale may be formed as shown in Figure 1, by lines 3 parallel to the zero line and each side thereof, or, as in Figures 5 and 6 by a scale 4 having divisions corresponding to the divisions on the straight edge 2, so as to enable the straight edge to be moved to right or left of the plotting line, and at the same time to be maintained at right angles thereto in order to make a new zero mark 15. In the case of a plotter of transparent material (as illustrated in the drawings), the secondary scale and the divisions of the protractor and the straight edge would preferably be formed on the under side in the usual manner.

In Figure 1, a V notch 5, formed in the plate 1 or, preferably, in a piece of hard material fixed to the under side of the plate 1, enables the zero point on the scale to be held against a pin 6 inserted in the plotting line 7, in order to ensure that the plotter will pivot about this point when held against the pin 6 or the like. A raised knob 8 is attached to the plate 1 for easy handling thereof.

Figure 4:
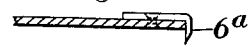
Figure 4 is a view of a pivot point for the plotter.
Figure 3:
Figure 3 is a cross section on line A—A of Figure 1.
Figure 5:
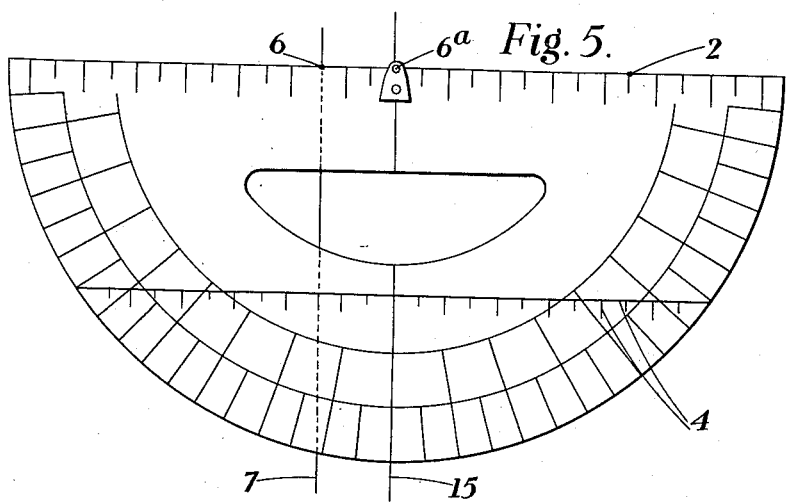
Figure 5 is a plan of the plotter showing it in use from a "change point."
Figure 6:
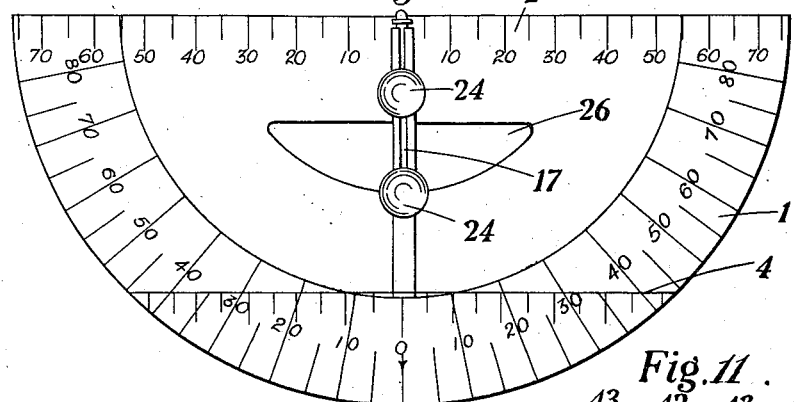
Figure 6 is a plan of a plotter similar to that shown in Figure 5 but with different pin or needle holding means.
Figure 7:
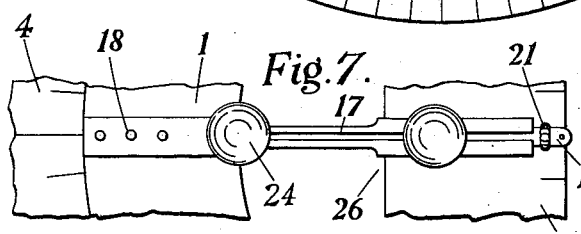
Figure 7 is a plan of the needle holding means shown in Figure 6, but drawn to a larger scale.

In Figures 4 and 5, a fixed pin 6a is shown in place of the V notch. This obviates the use of a loose pin.

Figure 2:
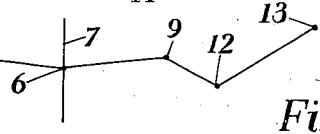
Figure 2 is a plotted cross-section.

As an example of the use of the new plotting device, the usual vertical plotting line 7 is marked on the paper with the chosen point at which it is desired to plot the cross section. This point represents the peg or position from which field measurements have been taken. The plotter is brought with its straight edge zero mark at this point, the pin 6 having been inserted at such point and the notch 5 on the straight edge engaged with it, as shown in Figure 1. To plot a point which was found in the field to be 20 feet to the right on an angle of elevation of 10 degrees, the plotter is swung about its pivot pin 6 to the right until the 10 degrees marked on the angle scale coincides with the extension of the plotting line 7, as shown in Figure 1; then a mark 9 placed opposite the 20 foot mark on the straight edge scale will be the correct representation on paper of the point required. To obtain a point 12 which has been found to be 30 feet to the right at an angle of depression of 5 degrees, the plotter is moved to the position shown in dotted lines and the point 12 marked off similarly to the point 9. To plot a further point 13 found to be 50 feet to the right at an angle of elevation of 10 degrees, the plotter is again swung until the 10 degrees mark on the angle scale to the left of the zero mark coincides with the plotting line, as in Figure 1, and the point 13 marked. These points are then joined by pencil lines to form the completely plotted section as shown in Figure 2. Similar points on the other side of the plotting line may be obtained where a point 14, at an elevation of 5 degrees and 25 feet to the left, is shown.

In the case where it has been necessary in the field to change position to enable measurements to be taken to points not visible from the chainage peg, such change point is plotted as before described, then the plotter is shifted so that the pin 6 coincides with the change point. Now by use of the lines perpendicular to the straight edge of the scale 4, it may be readily observed when the zero line is parallel to the plotting line 7, and consequently the straight edge 2 at right angles thereto, so that if a mark 15 is made on the paper opposite the zero, the plotter may then be swung to plot any angle by bringing the number of degrees representing such angle opposite the mark 15 so made, after which the point is marked along the straight edge as before.

The device shown in Figures 6 to 9 is particularly suitable for use on a field table, and has an arm 17 secured at one end by rivets 18 to the celluloid plotter at about the secondary scale, the other end of the arm having a vertical projection 19 drilled with a fine hole to take a small needle 20 which is held at any desired height, securely, by means of a set screw 21. The needle may, therefore, be replaced if broken or lost.

Figure 8:
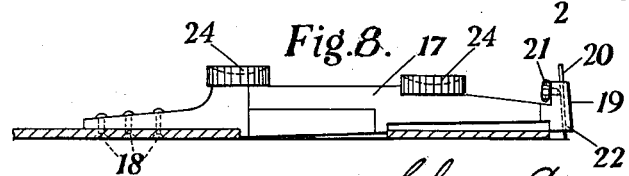
Figure 8 is a section through the plotter showing the needle holding means of Figure 6 in side elevation.
Figure 9:
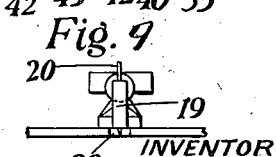
Figure 9 is an end view projected from Figure 8.

The lower part 22 of the needle-holding projection is rectangular and engages with a corresponding notch 23 in the plotter to ensure that the needle will always cut the zero of the scale when the arm is depressed by pressure upon two finger keys 24 fixed to the arm; the set of the arm at the fixed end is such that in their normal or idle position the arm and the needle are just clear of the drawing paper, as shown in Figure 8. The second and third fingers of the left hand, when placed on the keys, depress the needle on the board and may then execute a pivoting motion in order to swing the protractor as required, the points being plotted with the right hand. Another projection 25 on the underside of the arm bears against the cut-away segment 26 of the celluloid and helps to retain the motion of the arm to a vertical plane.

On removing the fingers from the keys, the needle is automatically raised to its normal position, as shown in Figure 8, so that the plotter may be slid in any direction quite freely for the purpose of ruling in lines to join plotted points without the needle engaging the paper.

Figure 10:
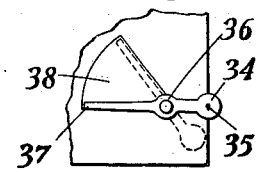
Figure 10 is a plan of a rotating pivot point for use with the loose pin type of plotter shown in Figure 1.

Figure 10 shows pivot holding means which are applicable particularly to set squares. A small rotating hand 34 carrying a fine hole 35 at one end, and a projection 37 extending upwards at the other, is fixed by a rivet 36 to the under side of the set square.

For plotting use, the axis of the hand coincides with the zero line, and the hole 35 is at the centre of the straight edge scale, so that a loose pin may be inserted in 35. The sector 38 and the dotted portion of the plotter are recessed, so that when the hand is rotated into the idle or dotted position it lies quite flush with the surface, so that the usefulness of the set square is in no way impaired for ordinary purposes. At each end of its throw projection 37 snaps into a depression which keeps the hand in position.

Figure 11:
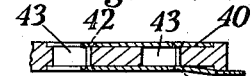
Figure 11 is a section of a sliding pivot point for use with the same type of plotter.
Figure 12:
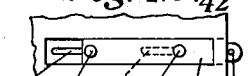
Figure 12 is a plan projected from Figure 11.

In Figures 11 and 12 the same result is obtained in another way. A flat piece of metal 41 on the under side and another piece 40 on top, are joined by rivets 42, which, with the pieces 40 and 41, may move between limits set by slots 43 in the plotter and along its zero line. The plotter is suitably recessed top and bottom to allow all metal parts to lie quite flush in the idle position. The piece 41 is longer than 40 and carries a fine hole which just projects beyond the zero of the straight edge, when pulled out as far as it will go.

It will thus be seen that, when the device is made in the form of a set square, the usefulness of the set square as such is in no way impaired.

I claim:—

1. A device for plotting cross-sections along a plotting line comprising a semi-circular plate, scale divisions marked on the straight diametral edge starting from zero at the centre and reading outwards, angle divisions marked on the curved edge starting from zero perpendicularly opposite the zero of the diametral edge and reading outwards, indicia on the device for enabling the straight edge to be set at right angles to the plotting line when any scale division thereof is set on the plotting line, and means for enabling the device to be pivoted about the zero point in the diametral edge.

2. A device for plotting cross-sections comprising a semi-circular plate, scale divisions marked on the straight diametral edge starting from zero at the centre and reading outwards, angle divisions marked on the curved edge starting from zero perpendicularly opposite the zero of the diametral edge and reading outwards, a plurality of lines marked on the plate parallel to the line joining the two zero points, and means for enabling the device to be pivoted about the zero point in the diametral edge.

3. A device for plotting cross-sections comprising a semi-circular plate, scale divisions marked on the straight diametral edge starting from zero at the centre and reading outwards, angle divisions marked on the curved edge starting from zero perpendicularly opposite the zero of the diametral edge and reading outwards, a line marked on the plate parallel to and at a distance from the diametral edge and having similar scale divisions, and means for enabling the device to be pivoted about the zero point in the diametral edge.

4. A device for plotting cross-sections along a plotting line comprising a semi-circular plate, scale divisions marked on the straight diametral edge starting from zero at the centre and reading outwards, angle divisions marked on the curved edge starting from zero perpendicularly opposite the zero of the diametral edge and reading outwards, indicia on the device for enabling the straight edge to be set at right angles to the plotting line when any scale division thereof is set on the plotting line and a V-shaped notch formed in the diametral edge at the zero point of the scale.

5. A device for plotting cross-sections along a plotting line comprising a semi-circular plate, scale divisions marked on the straight diametral edge starting from zero at the centre and reading outwards, angle divisions marked on the curved edge starting from zero perpendicularly opposite the zero of the diametral edge and reading outwards, indicia on the device for enabling the straight edge to be set at right angles to the plotting line when any scale division thereof is set on the plotting line, and a fixed pin projecting from the diametral edge at the zero point.

6. A device for plotting cross-sections comprising a semi-circular plate, scale divisions marked on the straight diametral edge starting from zero at the centre and reading outwards, angle divisions marked on the curved edge starting from zero perpendicularly opposite the zero of the diametral edge and reading outwards, indicia on the device for enabling the straight edge to be set at right angles to the plotting line when any scale division thereof is set on the plotting line, an arm attached to the upper side of the plate, a pin fitted on the end of the arm at the zero of the straight edge with its point normally above the lower surface of the plate, and means for enabling the arm to be depressed.

7. A device for plotting cross-sections comprising a semi-circular plate, scale divisions marked on the straight diametral edge starting from zero at the centre and reading outwards, angle divisions marked on the curved edge starting from zero perpendicularly opposite the zero of the diametral edge and reading outwards, indicia on the device for enabling the straight edge to be set at right angles to the plotting line when any scale division thereof is set on the plotting line, a pivot point located at the zero of the straight edge, and means for moving the pivot point from an operative to an inoperative position.

CHARLES EDWARD HUBERT WATSON.